G. HAVELL.
Satchel and Traveling-Bag Handles.
No. 158,077. Patented Dec. 22, 1874.
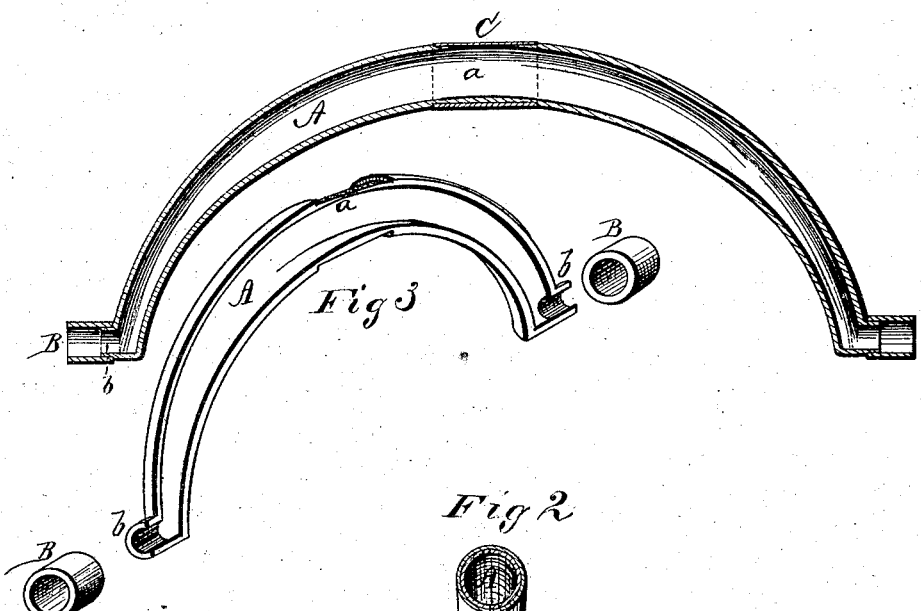
WITNESSES
Franck L. Durand
C. L. Ewert
INVENTOR
George Havell.
per
Alexander Mason
Attorneys

UNITED STATES PATENT OFFICE.

GEORGE HAVELL, OF NEWARK, NEW JERSEY, ASSIGNOR TO FREDERICK STEVENS, JAMES ROBERTS, AND GEORGE HAVELL, OF SAME PLACE.

IMPROVEMENT IN SATCHEL AND TRAVELING-BAG HANDLES.

Specification forming part of Letters Patent No. 158,077, dated December 22, 1874; application filed October 27, 1874.

*To all whom it may concern:*

Be it known that I, GEORGE HAVELL, of Newark, in the county of Essex, and in the State of New Jersey, have invented certain new and useful Improvements in Satchel, Valise, and Traveling-Bag Handles; and do hereby declare that the following is a full, clear, and exact description thereof, reference being had to the accompanying drawings and to the letters of reference marked thereon, making a part of this specification.

The nature of my invention consists in the construction and arrangement of a sheet-metal handle for satchels, valises, traveling-bags, shawl-straps, and other articles, as will be hereinafter more fully set forth.

In order to enable others skilled in the art to which my invention appertains to make and use the same, I will now proceed to describe its construction and operation, referring to the annexed drawing, in which—

Figure 1 is a longitudinal section of the completed handle. Fig. 2 is a cross-section of the same, and Fig. 3 is a perspective view of a part thereof.

The handle is made in two parts, A A, struck up of sheet metal in any suitable form and size, so that when put together they will form a hollow handle, in the center of which is a portion, $a$, of smaller diameter than the adjoining portion, and at each end is a short tubular projection, $b$.

Around the central reduced portion $a$ of the handle thus formed is placed a sheet metal collar, C, which is soldered thereto; and upon each tubular end projection, $b$, is also placed and soldered a collar, B.

This forms a strong and durable handle for the purposes named, and one which can be manufactured rapidly and cheaply.

Having thus fully described my invention, what I claim as new, and desire to secure by Letters Patent, is—

1. A hollow handle made of sheet metal, in curved form, and having at each end a hollow horizontal journal, $b$, surrounded by the collar B, as and for the purposes set forth.

2. The bisected hollow sheet-metal handle A A, provided with central reduced portion $a$ and tubular end projections $b\,b$, in combination with the center collar C, and end collars B B, substantially as and for the purposes herein set forth.

In testimony that I claim the foregoing, I have hereunto set my hand and seal this 5th day of October, 1874.

GEORGE HAVELL. [L. S.]

Witnesses:
C. L. EVERT,
JOHN N. KERR.